(12) United States Patent
Nakamura et al.

(10) Patent No.: US 10,747,946 B2
(45) Date of Patent: Aug. 18, 2020

(54) NON-TRANSITORY COMPUTER-READABLE STORAGE MEDIUM, ENCODING APPARATUS, AND ENCODING METHOD

(71) Applicant: FUJITSU LIMITED, Kawasaki-shi, Kanagawa (JP)

(72) Inventors: Fumiaki Nakamura, London (GB); Masahiro Kataoka, Kamakura (JP); Masao Ideuchi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 15/875,802

(22) Filed: Jan. 19, 2018

(65) Prior Publication Data

US 2018/0143954 A1 May 24, 2018

Related U.S. Application Data

(63) Continuation of application No. PCT/JP2015/071171, filed on Jul. 24, 2015.

(51) Int. Cl.
*G06F 40/157* (2020.01)
*G06F 40/284* (2020.01)
(Continued)

(52) U.S. Cl.
CPC .......... *G06F 40/157* (2020.01); *G06F 40/129* (2020.01); *G06F 40/242* (2020.01); *G06F 40/268* (2020.01); *G06F 40/284* (2020.01)

(58) Field of Classification Search
CPC ............. G06F 17/2223; G06F 17/2755; G06F 17/2276; G06F 17/2735; G06F 40/129; G06F 40/268; G06F 40/157; G06F 40/242
See application file for complete search history.

(56) References Cited

U.S. PATENT DOCUMENTS 4,777,617 A * 10/1988 Frisch .................. G06F 40/191
704/8
5,220,503 A * 6/1993 Suzuki .................... G06F 40/30
704/2
(Continued)

FOREIGN PATENT DOCUMENTS

JP H05-324427 A 12/1993
JP 07073279 A * 3/1995
(Continued)

OTHER PUBLICATIONS

International Search Report and Written Opinion of the International Searching Authority (Form PCT/ISA/210, 220 and 237), dated Aug. 25, 2015 in connection with PCT/JP2015/071171(total 7 pages).

*Primary Examiner* — Daniel C Washburn
*Assistant Examiner* — Oluwadamilola M Ogunbiyi
(74) *Attorney, Agent, or Firm* — Fujitsu Patent Center

(57) ABSTRACT

A non-transitory computer-readable storage medium storing a program that causes a computer to execute a process including detecting, from a text, one of a plurality of first strings included in first information, each of the plurality of first strings being associated with control information, determining whether to execute a determination process based on the control information associated with a specified string when the specified string is detected from the text, the determination process determining whether the second string is included in second information, the second information including at least one of third string being associated with another coded string, the second string being a string that includes the specified string at the beginning of the second string, executing the determination process when the determination process is determined to be executed and
(Continued)

transforming the second string into the another coded string associated with the third string.

8 Claims, 19 Drawing Sheets

(51) Int. Cl.
*G06F 40/268* (2020.01)
*G06F 40/242* (2020.01)
*G06F 40/129* (2020.01)

(56) References Cited

U.S. PATENT DOCUMENTS

| | | | | |
|---|---|---|---|---|
| 5,268,840 | A * | 12/1993 | Chang | G06F 40/53 |
| | | | | 704/9 |
| 5,361,205 | A * | 11/1994 | Nishino | G06F 17/274 |
| | | | | 704/2 |
| 5,590,317 | A | 12/1996 | Iguchi et al. | |
| 6,073,146 | A * | 6/2000 | Chen | G06F 17/2863 |
| | | | | 715/264 |
| 6,542,640 | B1 * | 4/2003 | Morihara | H03M 7/40 |
| | | | | 382/229 |
| 6,871,320 | B1 * | 3/2005 | Morihara | H03M 7/3084 |
| | | | | 715/236 |
| 10,176,151 | B2 * | 1/2019 | Hsieh | G06F 16/9574 |
| 2006/0129381 | A1 * | 6/2006 | Wakita | G06F 40/45 |
| | | | | 704/9 |
| 2006/0241353 | A1 * | 10/2006 | Makino | G16H 15/00 |
| | | | | 600/300 |
| 2007/0250903 | A1 * | 10/2007 | Furuichi | G06F 21/6245 |
| | | | | 726/1 |
| 2011/0246496 | A1 * | 10/2011 | Chung | G06F 16/951 |
| | | | | 707/766 |
| 2012/0023073 | A1 * | 1/2012 | Dean | G06F 16/355 |
| | | | | 707/693 |
| 2012/0078919 | A1 * | 3/2012 | Mineno | G06F 40/30 |
| | | | | 707/748 |
| 2013/0006629 | A1 * | 1/2013 | Honda | G10L 15/187 |
| | | | | 704/236 |
| 2013/0151957 | A1 * | 6/2013 | Kuroiwa | G06F 17/2211 |
| | | | | 715/256 |
| 2014/0026043 | A1 * | 1/2014 | Takeuchi | G06F 17/24 |
| | | | | 715/261 |
| 2014/0032210 | A1 * | 1/2014 | Baker | G09G 5/377 |
| | | | | 704/10 |
| 2014/0188893 | A1 * | 7/2014 | Kobayashi | G06F 16/2255 |
| | | | | 707/747 |
| 2016/0086200 | A1 * | 3/2016 | Yamakawa | G06Q 10/10 |
| | | | | 705/7.31 |
| 2016/0180028 | A1 * | 6/2016 | Hayakawa | G06Q 50/24 |
| | | | | 705/3 |
| 2016/0211863 | A1 * | 7/2016 | Kataoka | H03M 7/3084 |
| 2016/0217207 | A1 * | 7/2016 | Okura | G06F 16/3344 |
| 2016/0267323 | A1 * | 9/2016 | Chulinin | G06K 9/00463 |

FOREIGN PATENT DOCUMENTS

| | | |
|---|---|---|
| JP | H07-230461 A | 8/1995 |
| JP | H09-231219 A | 9/1997 |
| JP | H11-85790 A | 3/1999 |
| JP | 2003-044073 A | 2/2003 |

* cited by examiner

FIG. 1

| MORPHEME | PART OF SPEECH | CODE |
|---|---|---|
| Kanagawa | NOUN | 0x0105 |
| Ken | NOUN | 0x0213 |
| ⋮ | ⋮ | ⋮ |
| Live | VERB | 0x7537 |

FIG. 2

| STRING | CODE |
|---|---|
| Kanagawa Ken Kawasaki Shi Nakahara Ku Todoroki | 211-0052 |
| Kanagawa Ken Kawasaki Shi Nakahara Ku Kamikodanaka | 211-0053 |
| Kanagawa Ken Kawasaki Shi Nakahara Ku Kosugi | 213-0061 |
| ⋮ | |

FIG. 4

| MORPHEME | CODE |
|---|---|
| Kanagawa | 0x0105 |
| Ken | 0x0213 |
| ⋮ | |
| Kanagawa Ken Kawasaki Shi Kamikodanaka | 211-0053 |

FIG. 8

| MORPHEME | PART OF SPEECH | CODE | FLAG |
|---|---|---|---|
| Tokyo | NOUN | C1 | 1 |
| To | NOUN | C2 | 0 |
| Kanagawa | NOUN | C3 | 1 |
| Kawasaki | NOUN | C4 | 0 |
| Shi | NOUN | C5 | 0 |
| Nakahara | NOUN | C6 | 0 |
| Ku | NOUN | C7 | 0 |
| ⋮ | ⋮ | ⋮ | ⋮ |

FIG. 9

| STRING | CODE |
|---|---|
| Tokyo To | |
| Tokyo To Suginami Ku | D1 |
| ⋮ | ⋮ |
| Kanagawa Ken | |
| Kanagawa Ken Kawasaki Shi Saiwai Ku | D2 |
| Kanagawa Ken Kawasaki Shi Nakahara Ku | D3 |
| ⋮ | ⋮ |

901 ~ (first section starting at "STRING/CODE" header)
902 ~ (section starting at "Kanagawa Ken")

FIG. 13

| STRING | CODE |
|---|---|
| Tokyo 1 | |
| ⋮ | ⋮ |
| Tokyo 2 | |
| ⋮ | ⋮ |
| ⋮ | ⋮ |
| Kanagawa 1 | |
| ⋮ | ⋮ |
| Kanagawa 2 | |
| ⋮ | ⋮ |
| Kanagawa 3 | |
| ⋮ | ⋮ |
| Kanagawa 4 | |
| ⋮ | ⋮ |
| Kanagawa 5 | |
| ⋮ | ⋮ |

FIG. 14

| MORPHEME | OFFSET | Tokyo 1 | Tokyo 2 | ... | Kanagawa 1 | Kanagawa 2 | Kanagawa 3 | Kanagawa 4 | Kanagawa 5 | ... |
|---|---|---|---|---|---|---|---|---|---|---|
| Tokyo | 1 | 1 | 1 | ... | 0 | 0 | 0 | 0 | 0 | ... |
| ... | ... | ... | ... | ... | ... | ... | ... | ... | ... | ... |
| Kanagawa | 1 | 0 | 0 | ... | 1 | 1 | 1 | 1 | 1 | ... |
| Kanagawa | 2 | 0 | 0 | ... | 0 | 0 | 0 | 0 | 0 | ... |
| ... | ... | ... | ... | ... | ... | ... | ... | ... | ... | ... |
| Tama | 1 | 0 | 0 | ... | 0 | 0 | 0 | 0 | 0 | ... |
| Tama | 2 | 0 | 0 | ... | 0 | 0 | 0 | 0 | 0 | ... |
| Tama | 3 | 1 | 0 | ... | 0 | 0 | 0 | 0 | 0 | ... |
| Tama | 4 | 0 | 0 | ... | 0 | 0 | 0 | 0 | 0 | ... |
| Tama | 5 | 0 | 1 | ... | 0 | 0 | 1 | 0 | 0 | ... |

FIG. 17

| MORPHEME | OFFSET | Tokyo 1 | Tokyo 2 | ... | Kanagawa 1 | Kanagawa 2 | Kanagawa 3 | Kanagawa 4 | Kanagawa 5 | ... |
|---|---|---|---|---|---|---|---|---|---|---|
| Kanagawa | 1 | 0 | 0 | ... | 1 | 1 | 1 | 1 | 1 | ... |
| Ken | 2 | 0 | 0 | ... | 1 | 1 | 1 | 1 | 1 | ... |
| Kawasaki | 3 | 0 | 0 | ... | 1 | 0 | 1 | 0 | 0 | ... |
| Shi | 4 | 0 | 0 | ... | 1 | 1 | 1 | 0 | 0 | ... |
| Tama | 5 | 0 | 1 | ... | 0 | 0 | 1 | 0 | 0 | ... |
| Ku | 6 | 1 | 0 | ... | 0 | 1 | 1 | 1 | 0 | ... |
| Noborito | 7 | 0 | 0 | ... | 0 | 0 | 1 | 0 | 0 | ... |

FIG. 18

| ERROR MESSAGE | CODE |
|---|---|
| File Deliver Start | 0xe001 |
| Memory Allocate Error | 0xe002 |
| Multiple Start Error | 0xe003 |
| ⋮ | ⋮ |

NON-TRANSITORY COMPUTER-READABLE STORAGE MEDIUM, ENCODING APPARATUS, AND ENCODING METHOD

CROSS-REFERENCE TO RELATED APPLICATION(S)

This application is a continuation application of International Application PCT/JP2015/071171, filed on Jul. 24, 2015, the entire contents of which are incorporated herein by reference.

FIELD

The present disclosure relates to a non-transitory computer-readable storage medium, an encoding apparatus, and an encoding method.

BACKGROUND

Morphological analysis is a process of dividing a text into morphemes and assigning information about parts of speech to each morpheme. In some cases, each morpheme obtained by using the morphological analysis is used as a word.

A document information storage apparatus that encodes and stores morphemes extracted from document information has been known (see, for example, PTL 1). The document information storage apparatus performs the morphological analysis to extract the morphemes from inputted document information as components of the document information, encodes the extracted morphemes, compresses the encoded morphemes, and stores the compressed encoded morphemes in a storage unit.

CITATION LIST

Patent Literature

PTL 1: Japanese Laid-open Patent Publication No. 11-85790

SUMMARY

At a suggestion, a non-transitory computer-readable storage medium storing a program that causes a computer to execute a process, the process including detecting, from a text, one of a plurality of first strings included in first information stored in a storage device, each of the plurality of first strings being associated with control information and different coded strings respectively, determining whether to execute a determination process based on the control information associated with the specified string when a specified string included in the plurality of first strings is detected from the text, the control information indicating whether to execute the determination process, the determination process determining whether the second string is included in second information stored in the storage device, the second information including at least one of third string being associated with another coded string, the second string being a string that includes the specified string at the beginning of the second string and being longer than the specified string, executing the determination process when the determination process is determined to be executed in the determining and transforming the second string into the another coded string associated with the third string when the second string is included in the second information, transforming the specified string into the coded string associated with the specified string, and outputting the text after at least one of the second string and the specified string is transformed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a morphological analysis dictionary.
FIG. 2 illustrates a postal code dictionary.
FIG. 4 illustrates a morphological analysis dictionary to which codes in the postal code dictionary are added.
FIG. 8 illustrates a morphological analysis dictionary that includes switch information.
FIG. 9 illustrates an address dictionary.
FIG. 13 illustrates an address dictionary in which prefectures are divided into blocks.
FIG. 14 illustrates morpheme position information.
FIG. 17 illustrates filter information stored in a working area.
FIG. 18 illustrates an error message dictionary.

DESCRIPTION OF EMBODIMENTS

In some cases where two dictionaries are used for a two-step encoding process to improve a compression ratio, the process time of the above conventional encoding process is long.

In an aspect, it is an object of the present disclosure to improve the efficiency of the two-step encoding process on a text to be encoded.

An embodiment will now be described in detail with reference to the drawings.

The document information storage apparatus in PTL 1 encodes a document in a manner in which a code that is recorded in a postal code dictionary, a synonym dictionary, or another dictionary is assigned to one or more morphemes that are extracted from the document by using morphological analysis.

FIG. 1 illustrates an example of a morphological analysis dictionary used in morphological analysis. The morphological analysis dictionary in FIG. 1 includes morphemes, parts of speech, and codes. The parts of speech represent the parts of speech of the morphemes. The codes represent the codes that are associated with the respective morphemes.

FIG. 2 illustrates an example of the postal code dictionary. The postal code dictionary in FIG. 2 includes strings and codes. The strings each include morphemes representing an address to which a postal code is assigned. The codes represent the postal codes that are associated with the respective strings.

Figure 3:
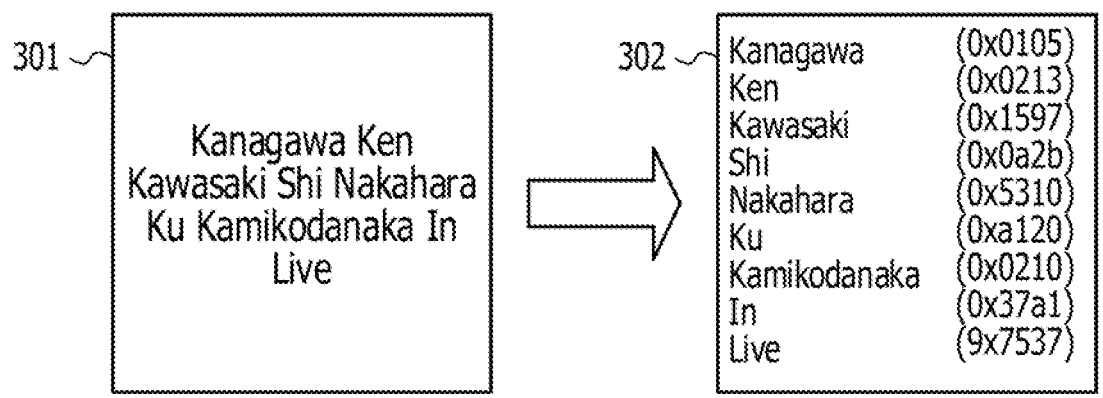
FIG. 3 illustrates an encoding process with the morphological analysis dictionary and the postal code dictionary.
Figure 3:
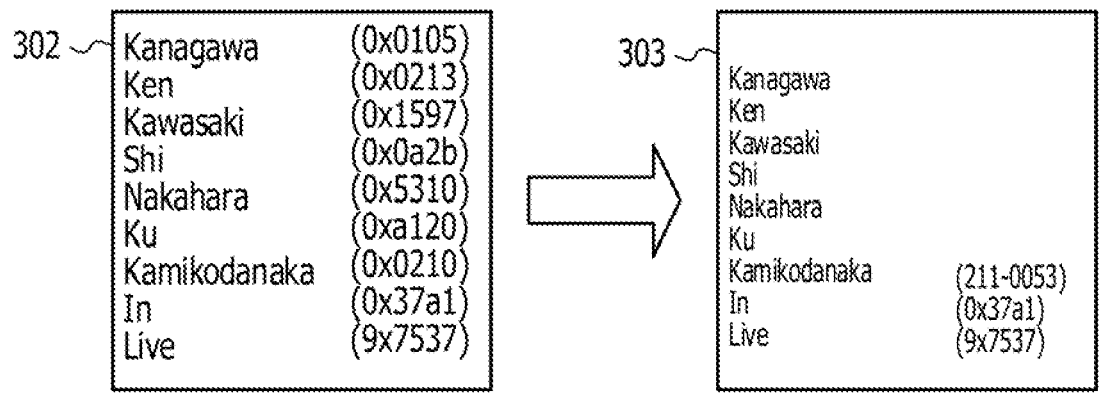

FIG. 3 illustrates an example of an encoding process with the morphological analysis dictionary in FIG. 1 and the postal code dictionary in FIG. 2. In the case where a text 301 to be encoded that is "Kanagawa Ken Kawasaki Shi Nakahara Ku Kamikodanaka in Live" is inputted, the text 301 to be encoded is first divided into morphemes by morphological analysis in a first pass. Each morpheme is converted into a code recorded in the morphological analysis dictionary, and an encoded text 302 is created. For example, "Kanagawa" that is the front morpheme in the text 301 to be encoded is converted into a hexadecimal code of 0x0105.

Subsequently, encoding in a second pass is performed such that strings included in the encoded text 302 are compared with strings recorded in the postal code dictionary, and, in the case where the two strings match with each other, the strings are converted into the codes recorded in the postal code dictionary, and an encoded text 303 is created. According to this example, a string that is "Kanagawa Ken Kawasaki Shi Nakahara Ku Kamikodanaka" is converted into a code of 211-0053. Thus, the encoding in the second pass enables the result of encoding in the first pass to be further compressed because the morphemes representing the address are converted into the code.

During the morphological analysis in the first pass, the morphological analysis dictionary is used to rapidly extract the morphemes, each of which is a minimum unit having a part of speech or a meaning. In the morphological analysis dictionary, a single code is assigned to a single morpheme. During the encoding in the second pass, the postal code dictionary is used to rapidly extract the strings representing the addresses. In the postal code dictionary, a single code is assigned to morphemes.

The number of the morphemes, to which the code is assigned, differs between the two dictionaries as above. Accordingly, the encoding process is divided into two passes (two steps) of the first pass and the second pass. The two-pass encoding process takes a longer time and uses more calculation resources such as storage areas than a single-pass encoding process.

FIG. 4 illustrates an example of the morphological analysis dictionary to which the codes in the postal code dictionary are added to perform the same process as the two-pass encoding process in a single pass. In the morphological analysis dictionary in FIG. 4, a string that is "Kanagawa Ken Kawasaki Shi Nakahara Ku Kamikodanaka" is recorded as the morpheme and associated with a code of 211-0053.

However, the frequency of appearance of the string representing the address in the text is lower than the frequency of appearance of the morphemes representing place names included in the address. Accordingly, in the case where the morphemes are extracted in descending order of the statistical frequency of appearance during the morphological analysis, the string representing the address is much less likely to be extracted. For this reason, the encoded text 303 is not created from the text 301 to be encoded but the encoded text 302 is created even when the morphological analysis dictionary in FIG. 4 is used. Consequently, the codes in the postal code dictionary are not used, and the compression ratio is not improved.

During the encoding in the second pass, the postal code dictionary is searched for all of the morphemes of the result of the morphological analysis in an exact longest match manner to assign one of the codes in the postal code dictionary to the string representing the address. In this case, the postal code dictionary is referred the same number of times as the number of the morphemes for an exact longest match search, and this takes an enormous amount of time.

This problem is not limited to the case where the postal code dictionary is used during the encoding in the second pass and arises also in the case where a dictionary that includes other strings other than the address is used.

Figure 5:
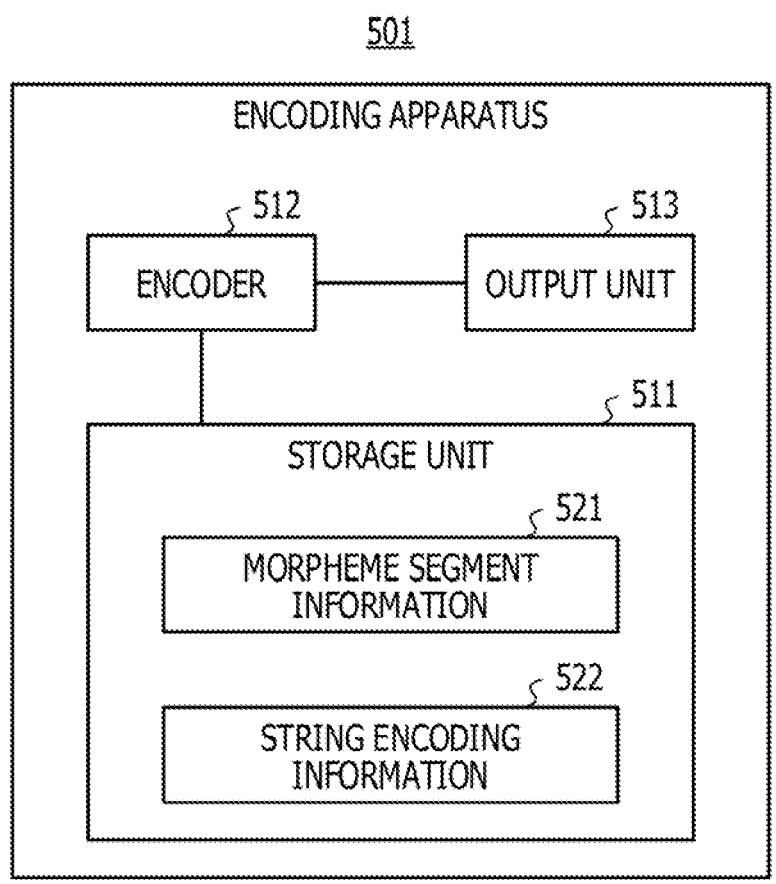
FIG. 5 illustrates a functional structure of an encoding apparatus.

FIG. 5 illustrates an example of a functional structure of an encoding apparatus according to the embodiment. An encoding apparatus 501 in FIG. 5 includes a storage unit 511, an encoder 512, and an output unit 513.

The storage unit 511 stores morpheme segment information 521 and string encoding information 522. The string encoding information 522 includes records. A recorded string and a code that is associated with the recorded string are recorded in each of the records. The morpheme segment information 521 includes records including respective morphemes and is used to segment the morphemes. The morpheme segment information 521 includes records including the respective front morphemes of the recorded strings of the records included in the string encoding information 522.

The encoder 512 encodes a text to be encoded based on the morpheme segment information 521 and the string encoding information 522 and creates the encoded text. The output unit 513 outputs the encoded text.

Figure 6:
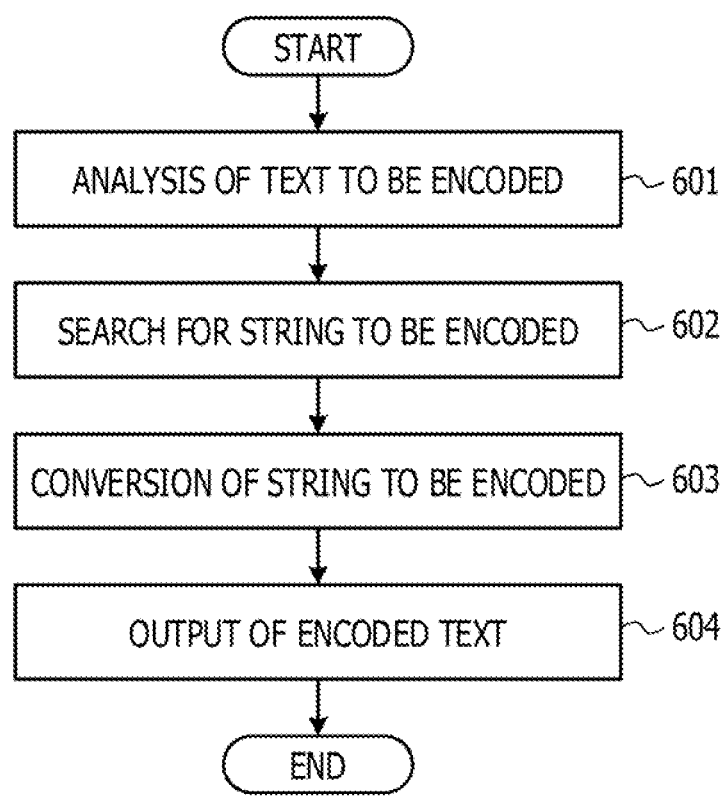
FIG. 6 is a flowchart of the encoding process.

FIG. 6 is a flowchart of an example of the encoding process that the encoding apparatus 501 in FIG. 5 performs. The encoder 512 first analyzes the text to be encoded based on the morpheme segment information 521 (step 601). The encoder 512 searches the string encoding information for a string to be encoded that begins with one of the morphemes and that is included in the text to be encoded in response to identification of the one of the morphemes included in the record corresponding to one of the recorded strings among the records included in the morpheme segment information 521 (step 602).

When the string to be encoded corresponds to the one of the recorded strings, the encoder 512 converts the string to be encoded into the code associated with the one of the recorded strings (step 603). The output unit 513 outputs the encoded text that includes the code after conversion (step 604).

The encoding apparatus 501 can improve the efficiency of the two-step encoding process on the text to be encoded.

Figure 7:
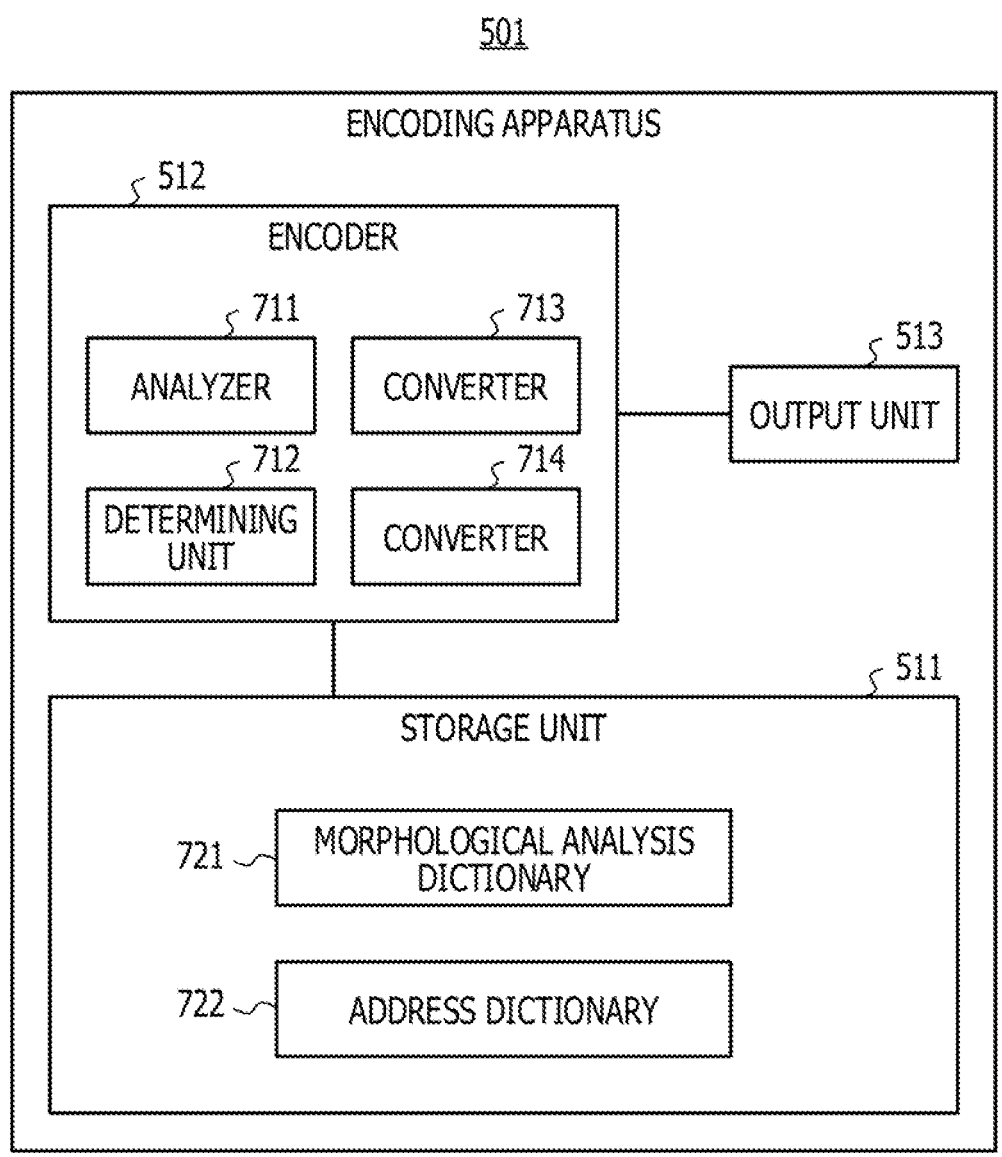
FIG. 7 illustrates a specific example of the functional structure of the encoding apparatus.

FIG. 7 illustrates a specific example of the encoding apparatus 501 in FIG. 5. The encoder 512 in FIG. 7 includes an analyzer 711, a determining unit 712, a converter 713, and a converter 714. The storage unit 511 stores a morphological analysis dictionary 721 and an address dictionary 722. The morphological analysis dictionary 721 and the address dictionary 722 correspond to the morpheme segment information 521 and the string encoding information 522 in FIG. 5, respectively.

FIG. 8 illustrates an example of the morphological analysis dictionary 721. The morphological analysis dictionary 721 in FIG. 8 includes morphemes, the parts of speech, codes, and flags. The parts of speech represent the parts of speech of the morphemes. The codes represent the codes that are associated with the respective morphemes. The flags are switch information representing whether the morphological analysis dictionary 721 is switched to the address dictionary 722. A flag value of a logic "1" represents that switching is performed. A flag value of a logic "0" represents that switching is not performed.

According to this example, the flags corresponding to the front morphemes of the strings representing the prefectures are set to a logic "1". For example, the part of speech of "Tokyo" is a noun, the code thereof is C1, and the flag thereof is a logic "1". The part of speech of "Kawasaki" is a noun, the code thereof is C4, and the flag thereof is a logic "0".

FIG. 9 illustrates an example of the address dictionary 722. The address dictionary 722 in FIG. 9 includes strings and codes. The strings include the morphemes representing the address. The codes represent the codes that are associated with the respective strings. The codes may be the postal codes. The strings recorded in the address dictionary 722 are divided into blocks corresponding to the prefectures. A separator 901 represents the start position of a block for "Tokyo To". A separator 902 represents the start position of a block for "Kanagawa Ken". For example, the code of "Tokyo To Suginami Ku" is D1. The code of "Kanagawa Ken Kawasaki Shi Nakahara Ku" is D3.

The analyzer 711 sets the switch information in the morphological analysis dictionary 721 and performs the morphological analysis on the text to be encoded based on the morphological analysis dictionary 721 to divide the text to be encoded into the morphemes. The determining unit 712 determines whether switching to the address dictionary 722 is performed for each morpheme created by the analyzer 711. The converter 713 converts the morphemes into the codes in the morphological analysis dictionary 721. The converter 714 converts the morphemes representing the address into the code in the address dictionary 722.

Figure 10:
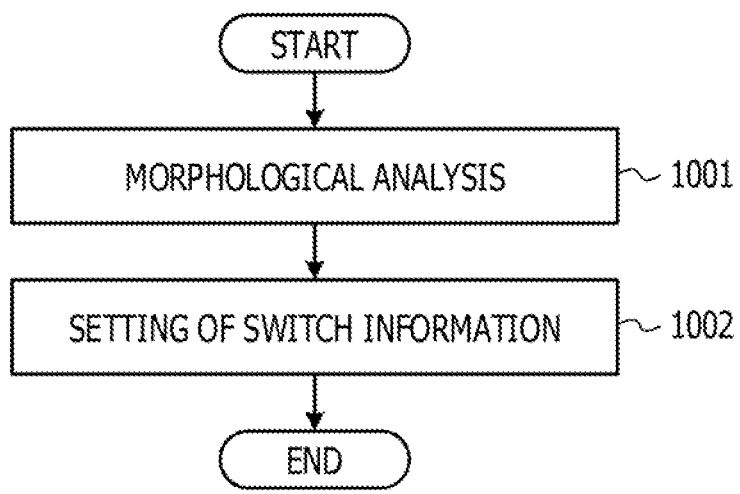
FIG. 10 is a flowchart of a process of setting the switch information.

FIG. 10 is a flowchart of an example of a process of setting the switch information that the analyzer 711 performs. At the beginning of the process of setting the switch information, the flags of all of the morphemes in the morphological analysis dictionary 721 are set to a logic "0". The analyzer 711 first performs the morphological analysis on the strings recorded in the address dictionary 722 based on the morphological analysis dictionary 721 to divide the strings into the morphemes (step 1001). The analyzer 711 selects the front morpheme of each string from the morphemes in the morphological analysis dictionary 721, changes the flag of the selected morpheme to a logic "1" to set the switch information (step 1002).

The analyzer 711 may set a pointer representing the start position of each block in the address dictionary 722 as the switch information instead of the flag. In this case, a pointer representing the position of the separator 901 is set as the switch information for "Tokyo", and a pointer representing the position of the separator 902 is set as the switch information for "Kanagawa".

Figure 11:
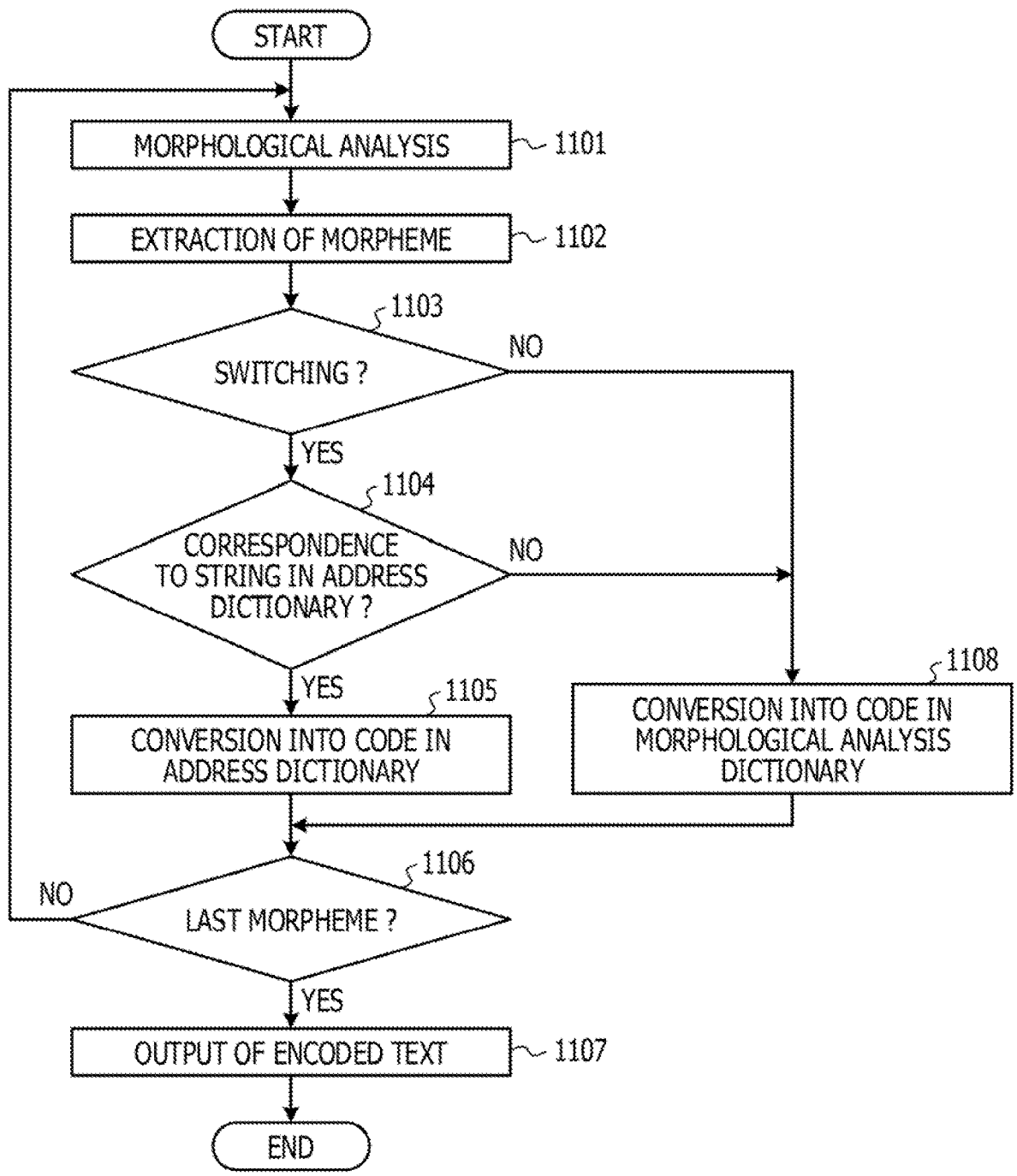
FIG. 11 is a flowchart of a specific example of the encoding process.

FIG. 11 is a flowchart of a specific example of the encoding process that the encoding apparatus 501 in FIG. 7 performs. The analyzer 711 first performs the morphological analysis on the text to be encoded based on the morphological analysis dictionary 721 (step 1101) to extract the morphemes from the text to be encoded in order from the front (step 1102). Subsequently, the determining unit 712 determines whether the switch information for each morpheme extracted by the analyzer 711 in the morphological analysis dictionary 721 represents switching (step 1103).

In the case where the switch information represents switching (step 1103, YES), the determining unit 712 searches the address dictionary 722 for a string to be encoded (morpheme group) that begins with the extracted morpheme and that is included in the text to be encoded (step 1104). At this time, the determining unit 712 searches the block indicated by the switch information for the string to be encoded and checks whether the string to be encoded is recorded in the block. The determining unit 712 can check whether the string to be encoded is recorded in the block in a manner in which the string to be encoded and each recorded string in the block are compared by using, for example, the exact longest match search.

In the case where the string to be encoded is recorded in the address dictionary 722 (step 1104, YES), the converter 714 converts the string to be encoded into the code recorded in the address dictionary 722 (step 1105). The determining unit 712 checks whether the last morpheme in the text to be encoded is converted into the code (step 1106). In the case where the last morpheme is not converted into the code (step 1106, NO), the determining unit 712 repeatedly performs the processes at the step 1101 and later on the remaining text.

In the case where the switch information does not represent switching (step 1103, NO), the converter 713 converts each morpheme extracted by the analyzer 711 into the code recorded in the morphological analysis dictionary 721 (step 1108). The encoder 512 performs the processes at the step 1106 and later. In the case where the string to be encoded is not recorded in the address dictionary 722 (step 1104, NO), the encoder 512 performs the processes at the step 1108 and later.

In the case where the last morpheme is converted into the code (step 1106, YES), the output unit 513 outputs the encoded text that includes a row of the codes (step 1107).

For example, a text to be encoded that is "Kanagawa Ken Kawasaki Shi Nakahara Ku In Live" is divided into "Kanagawa/Ken/Kawasaki/Shi/Nakahara/Ku/In/Live". In the morphological analysis dictionary 721 in FIG. 8, the flag "1" for "Kanagawa" represents switching, the block for "Kanagawa" in the address dictionary 722 in FIG. 9 is searched for a string that begins with "Kanagawa", and a recorded string that is "Kanagawa Ken Kawasaki Shi Nakahara Ku" is detected. Then, "Kanagawa/Ken/Kawasaki/Shi/Nakahara/Ku" is converted into the corresponding code D3, and the following "In" and "Live" are converted into the codes in the morphological analysis dictionary 721.

In the case where the pointers are used in the morphological analysis dictionary 721 instead of the flags, the presence of a pointer corresponding to the morphemes results in determination that the switch information represents switching, and the absence of a pointer results in determination that the switch information does not represent switching.

In this encoding process, the morphological analysis dictionary 721 is switched to the address dictionary 722 when each recorded string in the address dictionary 722 appears, and accordingly, the two-pass encoding process can be performed in a single pass. This enables the two-step encoding process to be speeded up and reduces calculation resources such as storage areas used for the encoding process.

The recorded strings are divided into the blocks corresponding to the front morphemes and recorded in the address dictionary 722. This enables the subject of the search to be limited to the block corresponding to the front morpheme of the string to be encoded. Consequently, the blocks to be searched are limited, and the efficiency of the search process is improved.

However, in the encoding process in FIG. 11, whenever the switch information representing switching is detected, the string to be encoded included in the text to be encoded is compared with all of the recorded strings in the corresponding block in the address dictionary 722 by using the exact longest match search. For this reason, in the case where a large number of the recorded strings are included in the block, the search process at the step 1104 takes a long time.

For example, a text to be encoded that is "Kanagawa To Go" is divided into "Kanagawa/To/Go". In the morphological analysis dictionary 721 in FIG. 8, the flag "1" for "Kanagawa" represents switching, and the address dictionary 722 is searched for a string that begins with "Kanagawa". However, none of the recorded strings in the address dictionary 722 include "To". For this reason, "Kanagawa" is converted into the code in the morphological analysis dictionary 721.

In the case where one of the morphemes in the text to be encoded matches one of the front morphemes of the recorded strings in the address dictionary 722, but the string to be encoded that begins with the morpheme matches none of the recorded strings in the address dictionary 722 as described above, the search time wastes. In view of this, it is preferable that search for strings that are not recorded in the address dictionary 722 be omitted to further speed up the encoding process.

Figure 12:
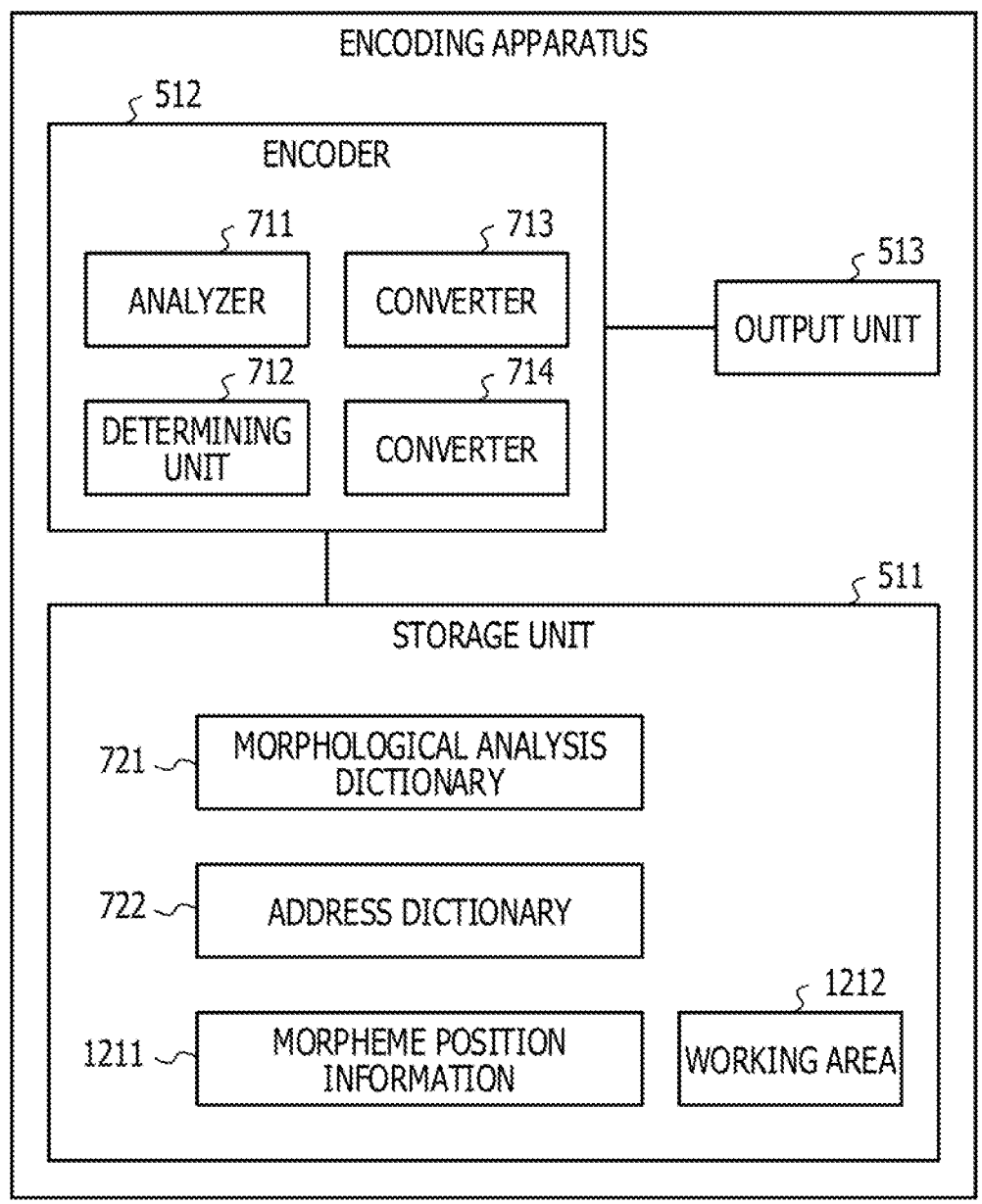
FIG. 12 illustrates a functional structure of the encoding apparatus in which search for strings that are not recorded is omitted.

FIG. 12 illustrates a specific example of the encoding apparatus 501 in which search for strings that are not recorded in the address dictionary 722 is omitted. The structure of the encoding apparatus 501 in FIG. 12 is the same as in the encoding apparatus 501 in FIG. 7. The storage unit 511 stores morpheme position information 1211 in addition to the morphological analysis dictionary 721 and the address dictionary 722 and includes a working area 1212. The morpheme position information 1211 represents a recorded-string position of each morpheme included in the recorded strings in the address dictionary 722. The working area 1212 is used to determine whether a string is recorded in the address dictionary 722 by using the morpheme position information 1211 and may be a stack.

FIG. 13 illustrates an example of the address dictionary 722 in which the addresses of the prefectures are divided into the blocks. "Tokyo 1" and "Tokyo 2" represent the address block name of "Tokyo To", and "Kanagawa 1" to "Kanagawa 5" represent the address block name of "Kanagawa Ken".

FIG. 14 illustrates an example of the morpheme position information 1211 corresponding to the address dictionary 722 in FIG. 13. The morpheme position information 1211 in FIG. 14 includes morphemes, offsets, and filter information about the blocks of the prefectures. The morphemes represent the morphemes included in the recorded strings in the address dictionary 722. The offsets represent the recorded-string positions of the morphemes. For example, a combination of "Tokyo" and the offset "1" represents that the front morpheme of the recorded string is "Tokyo", and a combination of "Tama" and the offset "3" represents that the third morpheme of the recorded string is "Tama".

The filter information is expressed by a bit string that includes bit values the number of which is equal to the number of the blocks. When one of the bit values for a block is a logic "1", one of the recorded strings included in the block includes the morpheme at a position represented by the offset. When one of the bit values for a block is a logic "0", all of the recorded strings included in the block do not include the morpheme at a position represented by the offset.

For example, the bit value "1" for "Tokyo 1" corresponding to the combination of "Tokyo" and the offset "1" represents that the block for "Tokyo 1" includes a recorded string in which the front morpheme is "Tokyo". The bit value "0" for "Kanagawa 1" corresponding to the combination of "Tokyo" and the offset "1" represents that the block for "Kanagawa 1" includes no recorded string in which the front morpheme is "Tokyo".

The bit value "1" for "Tokyo 1" corresponding to the combination of "Tama" and the offset "3" represents that the block for "Tokyo 1" includes a recorded string in which the third morpheme is "Tama". The bit value "1" for "Kanagawa 3" corresponding to a combination of "Tama" and the offset "5" represents that the block for "Kanagawa 3" includes a recorded string in which the fifth morpheme is "Tama".

The use of the morpheme position information 1211 enables determination whether a string to be encoded is recorded in the address dictionary 722 without comparison between the string to be encoded and the recorded strings. In addition, in the case where the string to be encoded is recorded in the address dictionary 722, the block that includes the string to be encoded can be narrowed from the blocks corresponding to the same front morpheme.

Figure 15:
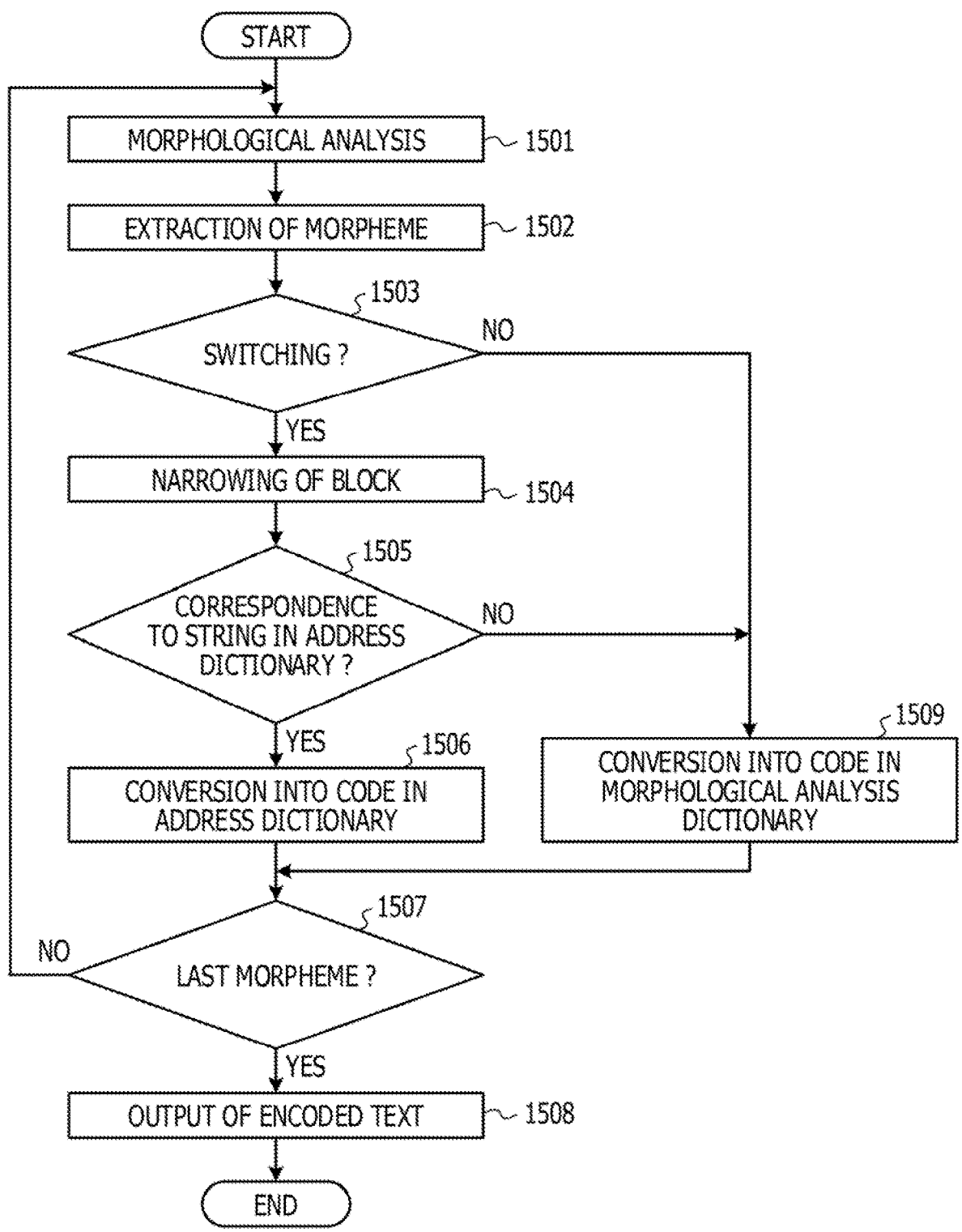
FIG. 15 is a flowchart of the encoding process in which search for strings that are not recorded is omitted.

FIG. 15 is a flowchart of a specific example of the encoding process that the encoding apparatus 501 in FIG. 12 performs. Processes at step 1501 to step 1503 and step 1506 to step 1509 are the same as the processes at the step 1101 to the step 1103 and the step 1105 to the step 1108 in FIG. 11.

In the case where the switch information represents switching (step 1503, YES), the determining unit 712 narrows the blocks by using the morpheme position information 1211 to specify the block in the address dictionary 722 that is to be searched (step 1504). The determining unit 712 searches the block to be searched for the string to be encoded (step 1505). In the case where there is the block to be searched, the string to be encoded is recorded in the block to be searched (step 1505, YES), and accordingly, the encoder 512 performs the processes at the step 1506 and later.

In the case where there is no block to be searched, the string to be encoded is not recorded in the address dictionary 722 (step 1505, NO), and accordingly, the encoder 512 performs the processes at the step 1509 and later. In this case, the address dictionary 722 is not searched for the string to be encoded.

Figure 16:
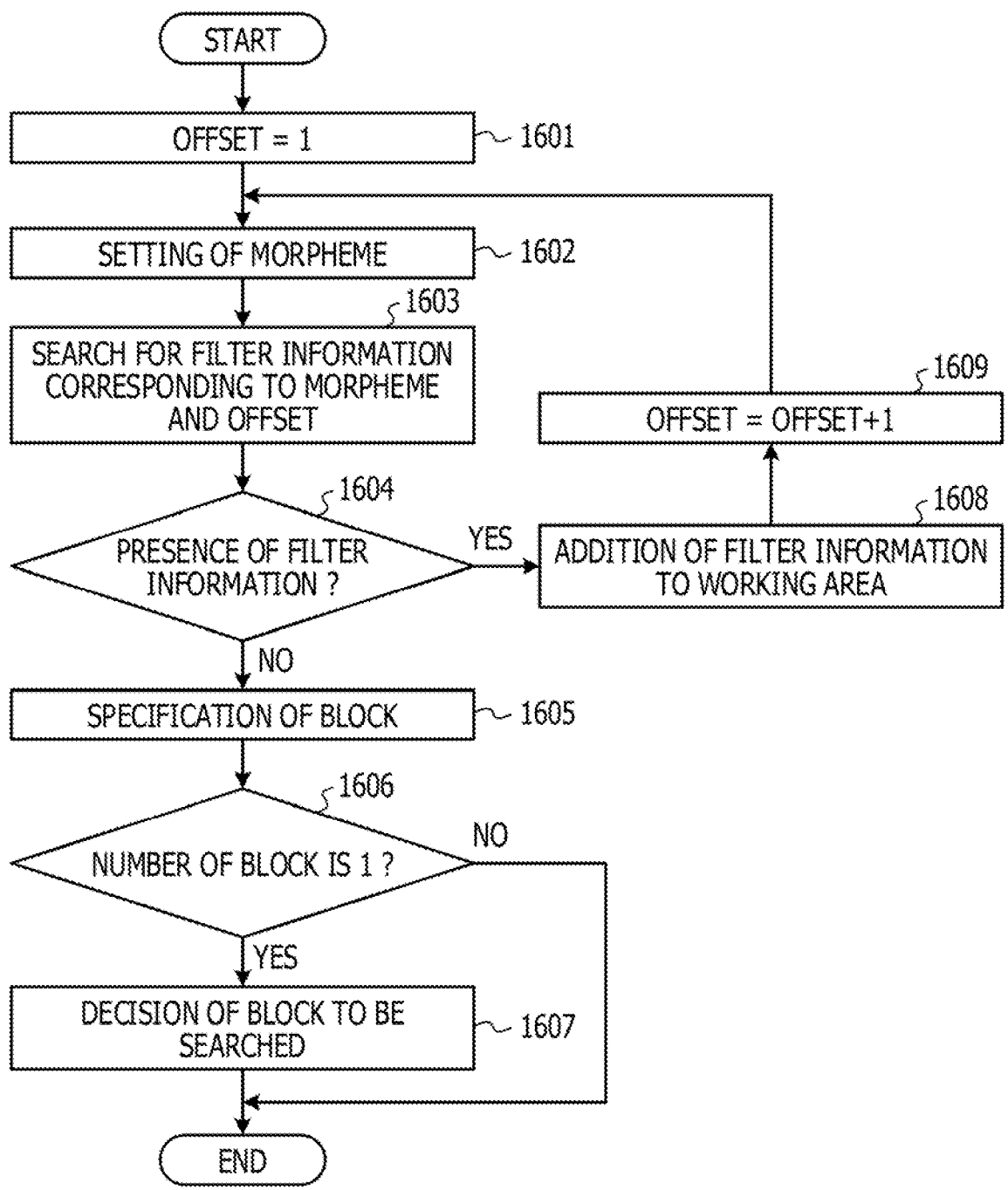
FIG. 16 is a flowchart of a process of narrowing the blocks.

FIG. 16 is a flowchart of an example of the process of narrowing the blocks that is performed at the step 1504 in FIG. 15. The determining unit 712 first sets a variable X, which represents an offset, to 1 (step 1601) and sets a variable W, which represents a morpheme, to the morpheme extracted at the step 1502 (step 1602).

Subsequently, the determining unit 712 searches the morpheme position information 1211 for the bit string of the filter information corresponding to X and W (step 1603) and checks whether there is the corresponding filter information (step 1604). In the case where there is the corresponding filter information (step 1604, YES), the determining unit 712 adds the filter information to the working area 1212 (step 1607) and increments X by 1 (step 1608). The determining unit 712 sets W to the next morpheme in the text to be encoded (step 1602) and repeatedly performs the processes at the step 1603 and later.

In the case where there is no corresponding filter information (step 1604, NO), the determining unit 712 refers the filter information stored in the working area 1212 to specify the blocks in which the bit values for all of the morphemes are "1" (step 1605). The determining unit 712 checks the number of the specified blocks (step 1606).

In the case where the number of the specified block is 1 (step 1606, YES), the determining unit 712 decides that this block is the block to be searched (step 1607). In the case where the number of the specified blocks is 2 or more (step 1606, NO), the determining unit 712 determines that the string to be encoded is not recorded in the address dictionary 722 and finishes the process.

FIG. 17 illustrates an example of the filter information stored in the working area 1212. For example, a text to be encoded that is "Kanagawa Ken Kawasaki Shi Tama Ku Noborito In Live" is divided into "Kanagawa/Ken/Kawasaki/Shi/Tama/Ku/Noborito/In/Live".

In the morphological analysis dictionary 721 in FIG. 8, the flag "1" for "Kanagawa" at the front represents switching, and accordingly, the morpheme position information 1211 in FIG. 14 is searched for the filter information corresponding to a combination of "Kanagawa" and the offset "1". The bit string of the corresponding filter information includes the bit value "1" in the blocks for "Kanagawa 1" to "Kanagawa 5". Accordingly, this bit string is added to the working area 1212.

Similarly, the morpheme position information 1211 is searched for the filter information corresponding to the following combinations of the morphemes and the offsets, and the filter information is added to the working area 1212.

"Ken" and "2"
"Kawasaki" and "3"
"Shi" and "4"
"Tama" and "5"
"Ku" and "6"
"Noborito" and "7"

However, the morpheme position information 1211 includes no filter information corresponding to the next combination of the morpheme "In" and the offset "8", and accordingly, seven pieces of the filter information in FIG. 17 are referred to specify the blocks in which the bit values for all of the morphemes are "1". At this time, the determining unit 712 may specify the blocks in which the bit values for all of the morphemes are "1" by an operation of logical conjunction of the bit strings in the vertical direction that include seven bit values and that correspond to the respective blocks in FIG. 17 and a bit string that includes seven bit values of "1".

In this case, the block for "Kanagawa 3" alone is the block in which the bit values for all of the morphemes are "1", and accordingly, this block is determined to be the block to be searched. Subsequently, the block for "Kanagawa 3" in the address dictionary 722 in FIG. 13 is searched for the string to be encoded that is "Kanagawa/Ken/Kawasaki/Shi/Tama/Ku/Noborito". "Kanagawa/Ken/Kawasaki/Shi/Tama/Ku/Noborito" is converted into the corresponding code. The following "In" and "Live" are converted into the codes in the morphological analysis dictionary 721.

A text to be encoded that is "Tokyo To Tama Shi Ichinomiya In Live" is divided into "Tokyo/To/Tama/Shi/Ichinomiya/In/Live". In the morphological analysis dictionary 721 in FIG. 8, the flag "1" for "Tokyo" at the front represents switching, and accordingly, the morpheme position information 1211 in FIG. 14 is searched for the filter information corresponding to the combination of "Tokyo" and the offset "1". The bit string of the corresponding filter information includes the bit value "1" in the blocks of "Tokyo 1" and "Tokyo 2", and accordingly, this bit string is added to the working area 1212.

Similarly, the morpheme position information 1211 is searched for the filter information corresponding to the following combinations of the morphemes and the offsets, and the filter information is added to the working area 1212.

"To" and "2"
"Tama" and "3"
"Shi" and "4"
"Ichinomiya" and "5"

However, the morpheme position information 1211 includes no filter information corresponding to the next combination of the morpheme "In" and the offset "6", and accordingly, five pieces of the filter information are referred to specify the blocks in which the bit values for all of the morphemes are "1". In the case where the block for "Tokyo 1" alone is the concerned block, and this block is determined to be the block to be searched.

Subsequently, the block for "Tokyo 1" in the address dictionary 722 in FIG. 13 is searched for the string to be encoded that is "Tokyo/To/Tama/Shi/Ichinomiya". "Tokyo/To/Tama/Shi/Ichinomiya" is converted into the corresponding code. The following "In" and "Live" are converted into the codes in the morphological analysis dictionary 721.

The text to be encoded that is "Kanagawa To Go" is divided into "Kanagawa/To/Go". In the morphological analysis dictionary 721 in FIG. 8, the flag "1" for "Kanagawa" at the front represents switching, the morpheme position information 1211 in FIG. 14 is searched for the filter information corresponding to the combination of "Kanagawa" and the offset "1". The bit string of the corresponding filter information includes the bit value "1" in the blocks for "Kanagawa 1" to "Kanagawa 5", and accordingly, this bit string is added to the working area 1212.

However, the morpheme position information 1211 includes no filter information corresponding to the next combination of the morpheme "To" and the offset "2", and accordingly, the filter information for "Kanagawa" is referred to specify the blocks in which the bit values are "1". In this case, the five blocks for "Kanagawa 1" to "Kanagawa 5" are concerned, and it is determined that no strings that begin with "Kanagawa" are recorded in the address dictionary 722. Accordingly, the address dictionary 722 is not searched for "Kanagawa", and "Kanagawa" is converted into the code in the morphological analysis dictionary 721.

In the case where one of the morphemes in the text to be encoded matches one of the front morphemes of the recorded strings in the address dictionary 722, but the string to be encoded that begins with the morpheme matches none of the recorded strings as described above, the encoding apparatus 501 in FIG. 12 omits search of the address dictionary 722. This reduces an unnecessary search process and further speeds up the encoding process.

A dictionary that includes other strings other than the addresses can be used for the encoding in the second pass instead of the address dictionary 722. For example, a proper noun dictionary that includes proper noun strings, a phrase dictionary that includes phrase strings, an idiomatic phrase dictionary that includes idiomatic phrase strings, an error message dictionary that includes error message strings, or another dictionary may be used instead of the address dictionary 722.

FIG. 18 illustrates an example of the error message dictionary. The error message dictionary in FIG. 18 includes error messages and codes. The error messages include morphemes representing the error messages. The codes represent the codes that are associated with the respective error messages. For example, the code of "File Deliver Start" is 0×e001, and the code of "Memory Allocate Error" is 0×e002. The error messages may be divided into blocks corresponding to the front morphemes and recorded in the error message dictionary as in the case of the address dictionary 722 in FIG. 9.

The structures of the encoding apparatus 501 in FIG. 5, FIG. 7, and FIG. 12 are illustrated by way of example. Some components may be omitted or changed in accordance with the usage and conditions of the encoding apparatus 501.

The flow charts in FIG. 6, FIG. 10, FIG. 11, FIG. 15, and FIG. 16 are illustrated by way of example. Some processes may be omitted or changed in accordance with the structure and conditions of the encoding apparatus 501. For example, in the case where the switch information is set in the morphological analysis dictionary 721 in advance, the process of setting the switch information in FIG. 10 can be omitted.

The morphological analysis dictionary in FIG. 8, the address dictionaries in FIG. 9 and FIG. 13, the morpheme position information in FIG. 14, and the error message dictionary in FIG. 18 are illustrated by way of example. Another morphological analysis dictionary, another address dictionary, another morpheme position information, or another error message dictionary may be used in accordance with the structure and conditions of the encoding apparatus 501. For example, in the encoding apparatus 501 in FIG. 12, the address dictionary in FIG. 9 may be used instead of the address dictionary in FIG. 13.

Figure 19:
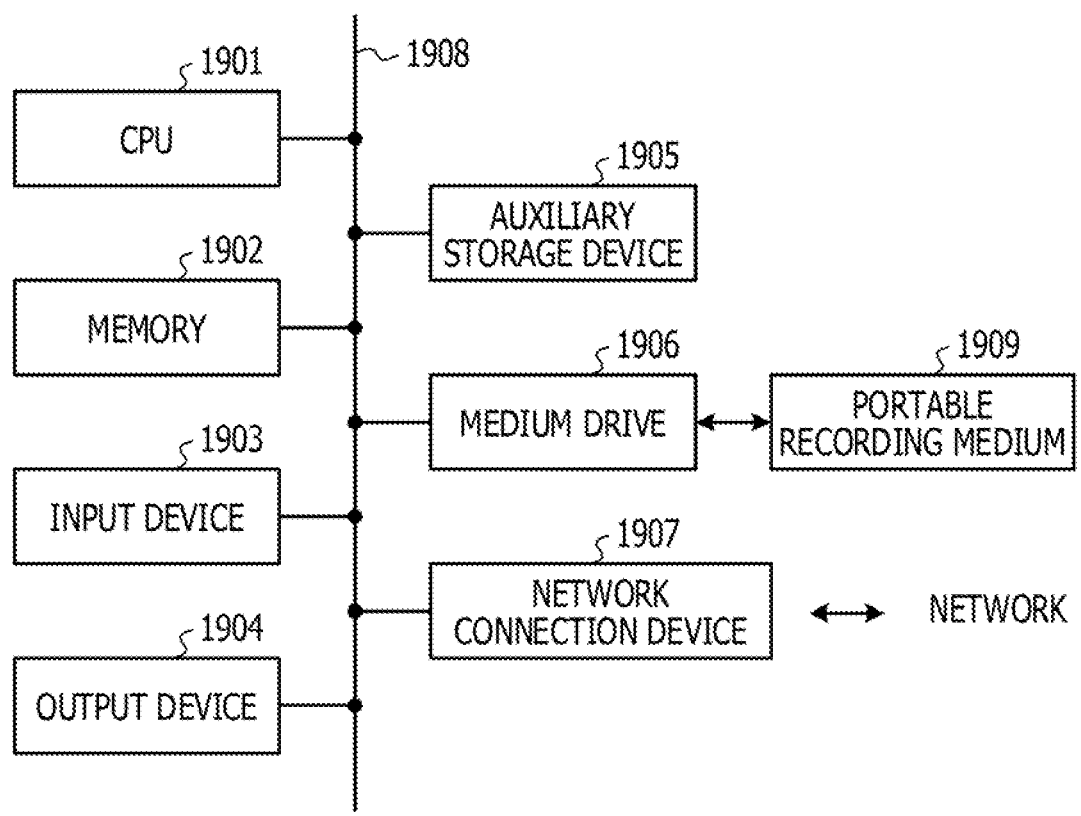
FIG. 19 illustrates the structure of an information processing apparatus.

The encoding apparatus 501 in FIG. 5, FIG. 7, and FIG. 12 can be made by using, for example, an information-processing apparatus (computer) illustrated in FIG. 19. The information-processing apparatus in FIG. 19 includes a central processing unit (CPU) 1901, a memory 1902, an input device 1903, an output device 1904, an auxiliary storage device 1905, a medium drive 1906, and a network connection device 1907. These components are connected to each other with a bus 1908.

The memory 1902 is, for example, a semiconductor memory such as a read only memory (ROM), a random access memory (RAM), or a flash memory. The memory 1902 stores a program for the encoding process and data. The memory 1902 can be used as the storage unit 511 in FIG. 5, FIG. 7, and FIG. 12.

The CPU 1901 (processor) executes the program by using, for example, the memory 1902 and thereby functions as the encoder 512, the analyzer 711, the determining unit 712, the converter 713, and the converter 714 in FIG. 5, FIG. 7, and FIG. 12 to perform the encoding process.

The input device 1903 is, for example, a keyboard or a pointing device and is used to input instructions and information from a user or an operator. The output device 1904 is, for example, a display device, a printer, or a speaker and is used to output an enquiry or a processing result to a user or an operator.

The auxiliary storage device 1905 is, for example, a magnetic disk device, an optical disk device, a magneto-optical disk device, or a tape device. The auxiliary storage device 1905 may be a hard disk drive or a flash memory. The information-processing apparatus stores the program and the data in the auxiliary storage device 1905 and can use the program and the data that are loaded into the memory 1902. The auxiliary storage device 1905 can be used as the storage unit 511 in FIG. 5, FIG. 7, and FIG. 12.

The medium drive 1906 drives a portable recording medium 1909 and accesses recorded contents thereof. Examples of the portable recording medium 1909 include a memory device, a flexible disk, an optical disk, and a magneto-optical disk. The portable recording medium 1909 may be a compact disk read only memory (CD-ROM), a digital versatile disk (DVD), or a universal serial bus (USB) memory. A user or an operator stores the program and the data into the portable recording medium 1909 and can use the program and the data that are loaded into the memory 1902.

Such a readable recording medium of the computer that stores the program and the data is a physical (non-volatile) recording medium such as the memory 1902, the auxiliary storage device 1905, and the portable recording medium 1909.

The network connection device 1907 is a communication interface that is connected to a communication network such as a local area network (LAN) or the Internet and that performs data conversion during communication. The information-processing apparatus uses the network connection device 1907 to receive the program and the data from an external device and can use the program and the data that are loaded into the memory 1902. The network connection device 1907 can be used as the output unit 513 in FIG. 5, FIG. 7, and FIG. 12.

The information-processing apparatus does not necessarily include all of the components in FIG. 19. Some components can be omitted in accordance with the usage and the conditions. For example, in the case where no instructions or information is inputted from a user or an operator, the input device 1903 may be omitted. In the case where neither enquiry nor processing result is outputted to a user or an operator, the output device 1904 may be omitted. In the case where the information-processing apparatus does not access the portable recording medium 1909 or the communication network, the medium drive 1906 or the network connection device 1907 may be omitted.

The embodiment of the disclosure and the advantages thereof are described in detail. A person skilled in the art can made various modifications, additions, and omissions without departing from the scope of the present disclosure that is clearly recited in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A morphological analysis apparatus comprising:
    a memory storing a first dictionary and second dictionary,
    the first dictionary defines a relationship between a plurality of morphemes and a plurality of first codes,
    the second dictionary defines a different relationship between the plurality of morphemes and a plurality of second codes and includes a plurality of strings of morphemes, each string including at least one morpheme; and
    a processor performing a morphological analysis on text including a plurality of morphemes, the analysis including:
    detecting a first morpheme from the text;
    determining based on control information associated with the first morpheme whether to search the first dictionary for a corresponding first code or second dictionary for a corresponding second code;

searching only a subset of the plurality of strings of morphemes in the second dictionary for the corresponding second code when the control information causes search for a corresponding second code, the subset being strings stored in the second dictionary that have a beginning morpheme of a string that corresponds to the first morpheme;

searching the first dictionary for a corresponding first code when the control information indicates to search for a corresponding first code and when searching the second dictionary does not find a corresponding second code;

encoding the text by replacing the first morpheme with the corresponding first code or the corresponding second code; and outputting the encoded text.

2. The morphological analysis apparatus according to claim 1, wherein each string includes a plurality of morphemes.

3. The morphological analysis apparatus according to claim 1, wherein
the first dictionary is a morphological analysis dictionary and the second dictionary is one of a postal code dictionary, address dictionary, error message dictionary and synonym dictionary.

4. The morphological analysis apparatus according to claim 1, wherein
the control information is a flag or pointer causing the processing to search the first dictionary or second dictionary for a first code or second code corresponding to the first morpheme.

5. The morphological analysis apparatus according to claim 1, wherein
the control information includes position information identifying a sequential position of a morpheme within the text.

6. The morphological analysis apparatus according to claim 1, wherein the memory further stores a chart including the plurality of morphemes, corresponding control information and corresponding position information of a morpheme within the text.

7. A non-transitory computer readable medium storing a program that causes a computer to execute a process, the process comprising:
storing a first dictionary and a second dictionary,
the first dictionary defines a relationship between a plurality of morphemes and a plurality of first codes,
the second dictionary defines a different relationship between the plurality of morphemes and a plurality of second codes and includes a plurality of strings of morphemes, each string including at least one morpheme; and
performing a morphological analysis on text including a plurality of morphemes, the analysis including:
detecting a first morpheme from the text;
determining based on control information associated with the first morpheme whether to search the first dictionary for a corresponding first code or second dictionary for a corresponding second code;
searching only a subset of the plurality of strings of morphemes in the second dictionary for the corresponding second code when the control information causes search for a corresponding second code, the subset being strings stored in the second dictionary that have a beginning morpheme of a string that corresponds to the first morpheme;
searching the first dictionary for a corresponding first code when the control information indicates to search for a corresponding first code and when searching the second dictionary does not find a corresponding second code;
encoding the text by replacing the first morpheme with the corresponding first code or the corresponding second code; and
outputting the encoded text.

8. A morphological analysis method comprising:
storing, in a memory, a first dictionary and a second dictionary,
the first dictionary defines a relationship between a plurality of morphemes and a plurality of first codes,
the second dictionary defines a different relationship between the plurality of morphemes and a plurality of second codes and includes a plurality of strings of morphemes, each string including at least one morpheme; and
performing, with a processor, a morphological analysis on text including a plurality of morphemes, the analysis including:
detecting a first morpheme from the text;
determining based on control information associated with the first morpheme whether to search the first dictionary for a corresponding first code or second dictionary for a corresponding second code;
searching only a subset of the plurality of strings of morphemes in the second dictionary for the corresponding second code when the control information causes search for a corresponding second code, the subset being strings stored in the second dictionary that have a beginning morpheme of a string that corresponds to the first morpheme;
searching the first dictionary for a corresponding first code when the control information indicates to search for a corresponding first code and when searching the second dictionary does not find a corresponding second code;
encoding the text by replacing the first morpheme with the corresponding first code or the corresponding second code; and
outputting the encoded text.

* * * * *